United States Patent Office 3,580,873
Patented May 25, 1971

3,580,873
NONYELLOWING POLYURETHANE
Dominick Bianca, Wilmington, Del., assignor to E. I. du Pont de Nemours and Company, Wilmington, Del.
No Drawing. Filed Oct. 18, 1967, Ser. No. 676,033
Int. Cl. C08g 22/08
U.S. Cl. 260—18
7 Claims

ABSTRACT OF THE DISCLOSURE

A nonyellowing polyurethane prepared by reacting an isocyanato-terminated prepolymer with a mixture of monoethanolamine and triethanolamine in the presence of a catalytic amount of a metal drier compound such as calcium-, zinc- or lead naphthenate or octoate.

BACKGROUND OF THE INVENTION

Preparation of polyurethane products, particularly cellular products, is a well established industry. Rigid and flexible open and closed cell polyurethanes are well known as materials for cushioning and insulation. However, polyurethanes of the art have invariably suffered from the serious deficiency of being subject to discoloration to an unsatisfactory yellow to brown color after aging, especially when exposed to actinic radiation. Attempts have been made to offset this discoloration by incorporation of antioxidants and pigments but these have been relatively ineffective. For this reason polyurethanes have generally been relegated to applications in which they are hidden from view as in mattresses, interliners for garments, thermal insulation in building structures and so on. Deeply pigmented polyurethanes are occasionally used in exposed applications, as in synthetic sponges, but even these change color due to discoloring of the polyurethane base material.

THE INVENTION

This invention relates to novel polyurethanes and more particularly to a new procedure whereby polyurethanes are produced which remain undiscolored for extended periods of time compared to polyurethanes known to the art.

This novel procedure basically involves reacting an isocyanato-terminated prepolymer with monoethanolamine in the presence of a catalytic amount of a metal drier compound. Apart from the particular reactants and catalysts utilized, the reaction is carried out using conventional conditions for making polyurethanes. The product can be a solid or a foam as desired. Foam products are preferably made by standard procedures whereby an inert blowing agent is admixed with the reactants prior to the reaction. The foams can be of the closed cell or open cell variety.

Although this invention can be practiced utilizing monoethanolamine as the sole amine reactant, the use of a mixture of mono- and triethanolamine containing up to 50% triethanolamine produces polyurethanes having superior physical properties, without sacrifice of color stability, and represents a preferred embodiment. Preferably the mixture will contain about 10–35% triethanolamine.

Any of the metal driers known to the art which do not impart color to the polyurethane product can be used in this invention. Notably these are compounds such as calcium naphthenate, zinc naphthenate and lead naphthenate. Similarly calcium octoate, zinc octoate and lead octoate can be utilized as well as compounds containing one of these metals in combination with other organic anions.

Polyurethanes prepared by the process of this invention are particularly suitable for molding light colored products which in use will be exposed to view. These products remain undiscolored for long periods of time despite exposure to direct sunlight and in this respect are quite unlike polyurethanes heretofore known. Foamed products of this invention are therefore useful for molding light colored soles and heels for shoes as well as in flooring, exposed protective cushioning and the like.

The polyurethanes of this invention are conveniently prepared by mixing an isocyanato-terminated prepolymer with approximately a stoichiometric amount of monoethanolamine and a catalytic amount of metal drier. The reaction is practically instantaneous. The prepolymer can be a polyether diisocyanate prepolymer or a polyester diisocyanate prepolymer but is preferably a polyalkyleneether diisocyanate prepolymer. Useful prepolymers generally have average molecular weights between about 750 and 3500 and preferably 850 to 1350. Preferred polyalkyleneether diisocyanates are those prepared by reacting a polyalkyleneether having two hydroxyl groups, for example, polyethyleneether glycol, polypropyleneether glycol or polytetramethyleneether glycol with a diisocyanate. Aromatic diisocyanates are preferred such as p-phenylene diisocyanate toluene 2,4-diisocyanate and methylene bis(4-phenyl isocyanate). The stoichiometric ratio of isocyanato groups to hydroxyl groups in the reactants used to prepare the prepolymer should preferably be 1.5–2/1. At lower ratios mixing becomes difficult and at higher ratios there will be some undesirable free diisocyanate in the mixture. If relatively hard inflexible products are desired a small amount of polyfunctional polyol can be added to the reaction mixture when the isocyanato-terminated prepolymer is formed. Small amounts of low molecular weight polyols such as propanediol, butanediol, trimethylolpropane and the like can also be used.

Normally the process of this invention is carried out utilizing stoichiometric quantities of isocyanato-terminated prepolymer and monoethanolamne but these amounts can be varied from 90 to 110% of the amount theoretically needed for the reaction. The metal drier catalyst is employed in an amount of about 0.01–1 phr. (parts by weight per 100 parts prepolymer) and preferably in the amount of 0.02–0.1 phr.

Any liquid blowing agent utilized to prepare foam products in accordance with this invention should be a liquid at room temperature and a vapor at the temperature and pressure existing during the reaction of the prepolymer with monoethanolamine. The temperature will usually be above about 50° C. and the pressure will normally be superatmospheric. Naturally the blowing agent should be inert toward the other components of the reaction mixture and toward the polyurethane product. Suitable blowing agents include trichlorofluoromethane, dichlorodifluoroethane, methylene chloride and others which are well known to the art. It is generally desirable that the blowing agent have a boiling point below 100° C. Methylene chloride is a preferred blowing agent.

Density of cellular products made according to this invention is dependent upon the amount of inert vaporizable liquid used. When density is reduced below about 25 lbs./cu. ft. by using a relatively large amount of vaporizable liquids the cellular structure tends to shrink. Desirably an amount of inert liquid is used which produces foamed polyurethane structures having a density of at least 25 pounds per cubic foot.

The reaction can be carried out in any conventional mixing device for making polyurethanes and any of the additives or practices conventional in the art can be utilized. A surfactant is generally necessary when cellular products are being made. Also the polyurethane can be molded in such a way as to form an outer skin surface if desired. Both closed and open cellular structures can be formed.

The following examples illustrate the invention. All parts and percentages are by weight unless otherwise indicated.

EXAMPLES 1–8

Several isocyanato-terminated prepolymers are utilized in making polyurethane foams in the examples which follow. These prepolymers (A, B, C, D) are made by reacting polyol and toluene diisocyanate in the molar proportions shown below for four hours at 80° C. under agitation in a nitrogen atmosphere.

TABLE I

|  | A | B | C | D |
|---|---|---|---|---|
| Polytetramethyleneether glycol, mol. wt. 1,000 | 1.0 | 1.0 | .75 | |
| Polytetramethyleneether glycol, mol. wt. 2,000 | | | | .70 |
| Polypropyleneether glycol, mol. wt. 2,000 | | | | .30 |
| Butanediol-1,3 | | | .25 | |
| 2,4-toluene diisocyanate | 1.6 | 2.0 | 2.08 | |
| 80:20 2,4-2,6-toluene diisocyanate | | | | 1.0 |

A representative isocyanato-terminated polyester prepolymer, purchased commercially and thought to be a diisocyanate/ethylene glycol adipate reaction product, referred to as prepolymer E, is also utilized to prepare a polyurethane foam according to this invention.

Example 1

A microcellular polyurethane foam is made from prepolymer B above by the procedure described in the article by D. Bianca and R. E. Knox in Rubber Age, volume 98, No. 5, May 1966. In accordance with this procedure two mixtures are prepared, one containing prepolymer, methylene chloride and silicone surfactant and the other containing the amine reactant and catalyst as set forth in Table II.

TABLE II

Prepolymer stream:
  Prepolymer B _____ 100
  Methylene chloride _____ 6
  Silicone surfactant [1] _____ 1
Amine stream:
  Ethanolamine _____ 3.2
  Triethanolamine _____ 1.8
  Lead naphthenate (24% lead) _____ 0.01

[1] Polydimethyl siloxane/polyalkyleneether copolymer.

The prepolymer stream at 57° C. and the amine stream at 40° C. are introduced into a conventional reaction vessel where the reaction occurs practically instantaneously. Upon being discharged from the reaction vessel gas evolution results in foaming which is completed in about twenty seconds. In approximately three minutes the product is tack free and can be demolded. The product is a white microcellular polyurethane foam having a density of 33.6 pounds per cubic foot (0.54 g./cm.$^3$). Physical properties determined in a conventional manner are as follows:

TABLE III

| | |
|---|---|
| Hardness, Durometer A | 14 |
| Hardness, Durometer OO | 69 |
| Water absorption, percent by weight | 6.4 |
| 100% modulus, p.s.i. | 35 |
| 300% modulus, p.s.i. | 55 |
| Tensile strength at break, p.s.i. | 100 |
| Elongation at break, percent | 500 |
| Split tear—pli. | 10 |
| Graves tear—Die C, pli. | 27 |
| Compression modulus, p.s.i.: | |
|   At 10% deflection | 8 |
|   At 25% deflection | 21 |
|   At 50% deflection | 76 |
| Yerzley resilience, percent | 50 |

Each of the above prepolymers is utilized to make a polyurethane microcellular foam having closed cells. Several combinations of catalyst and prepolymers are utilized as shown in Table IV. Discoloration is measured on a "Color Master" differential colorimeter before and after exposure to light. The light values shown are tristimulus color dimension values C.I.E. according to the International Commission of Illumination. Higher values indicate lighter color. Color stability of the specimens is determined by exposure for fifty hours in an Atlas Fade-Ometer FDA–R. The amine curing agent used in making the control polyurethane is a liquid eutetic mixture of 58.2% cumene diamine and 41.8 m-phenylene diamine sold as "Caytur" 7. Silicone surfactants L–520 and CF–1034 are polydimethyl siloxane/polyalkyleneether copolymer. The physical properties of the products in Table IV are comparable to those in Table III.

TABLE IV

| Example | 2 | 3 | 4 | 5 | 6 | 7 | 8 | Control |
|---|---|---|---|---|---|---|---|---|
| Prepolymer: | | | | | | | | |
|   A | | | | | | | 50 | |
|   C | 100 | | | | | | 25 | 100 |
|   B | | 100 | 100 | 100 | 100 | | 25 | |
|   D | | | | | | 100 | | |
|   E | | | | | | | | |
| Methylene chloride | 6 | 6 | 6 | 6 | 6 | 6 | 6 | 8 |
| Surfactant L–520 | 1 | 1 | | 1 | 1 | 1 | 1 | 1 |
| Surfactant SF–1034 | | | 1 | | | | | |
| Ethanolamine | 5.8 | 3.4 | 3.2 | 3.2 | 3.2 | 3.2 | [1] 2.3 | |
| Triethanolamine | 1.9 | 1.8 | 1.8 | 1.8 | 1.8 | 1.8 | 1.3 | |
| "Caytur" 7 | | | | | | | | 10.6 |
| Lead naphthenate (24% lead) | .03 | .04 | | | | .04 | .04 | |
| Lead octoate (24% lead) | | | .02 | | | | | |
| Zinc naphthenate (10% zinc) | | | | .01 | | | | |
| Calcium naphthenate (5% calcium) | | | | | .01 | | | |
| Prepolymer stream temp., ° C | 60 | 49 | 56 | 61 | 63 | 48 | 89 | 48 |
| Amine stream temp., ° C | 40 | 25 | 40 | 40 | 40 | 40 | 25 | 40 |
| Color lightness values: | | | | | | | | |
|   Original | | 93.4 | 91.4 | | | 93.2 | | 59.3 |
|   After 50 hr. Fade-Ometer exposure | | 78.5 | 79.0 | | | 73.9 | | 47.4 |

[1] 1.5 parts L–520 also added to amine stream.

I claim:

1. In a polyurethane prepared by reacting a polyester or a polyalkyleneether having two hydroxyl groups with an aromatic diisocyanate to form an isocyanato-terminated prepolymer and reacting said isocyanato-terminated prepolymer with an amine the improvement characterized by utilizing as the amine reactant a composition consisting essentially of a mixture of monoethanolamine and triethanolamine said mixture containing about 10–50% by weight triethanolamine the amount of said mixture being from 90% to 110% of the stoichiometric amount, and carrying out the reaction in the presence of 0.01–1 part catalyst per 100 parts by weight of prepolymer said catalyst being calcium octoate, zinc octoate, lead octoate, calcium naphthenate, zinc naphthenate or lead naphthenate.

2. The product of claim 1 in which the prepolymer is a polyalkyleneether diisocyanate.

3. The product of claim 2 in which the prepolymer is a polyalkyleneether diisocyanate.

4. The product of claim 2 wherein the polyalkyleneether is polyethyleneether glycol, polypropyleneether glycol or polytetramethyleneether glycol.

5. The product of claim 4 wherein the aromatic diisocyanate is p-phenylene diisocyanate, toluene 2,4-diisocyanate or methylene bis-(4-phenyl isocyanate).

6. The product of claim 5 in which the catalyst is a naphthenate of calcium, zinc or lead.

7. The product of claim 5 in which the catalyst is an octoate of calcium, zinc or lead.

References Cited

UNITED STATES PATENTS

| | | | |
|---|---|---|---|
| 3,267,047 | 8/1966 | Gmitter et al. | 260—77.5X |
| 2,929,800 | 3/1960 | Hill | 260—77.5 |
| 3,427,346 | 2/1969 | Brotherton et al. | 260—77.5X |
| 3,331,887 | 7/1967 | Wakasa | 260—77.5X |
| 3,228,914 | 1/1966 | Saint-Frison | 260—77.5X |
| 3,136,731 | 6/1964 | Piechota et al. | 260—2.5 |
| 2,621,166 | 12/1952 | Schmidt et al. | 260—75 |

DONALD E. CZAJA, Primary Examiner

C. W. IVY, Assistant Examiner

U.S. Cl. X.R.

260—2.5, 75, 77.5